United States Patent [19]

Pedain et al.

[11] Patent Number: 5,076,958

[45] Date of Patent: Dec. 31, 1991

[54] PROCESS FOR THE PRODUCTION OF ISOCYANURATE POLYISOCYANATES, THE COMPOUNDS OBTAINED BY THIS PROCESS AND THEIR USE

[75] Inventors: Josef Pedain, Cologne; Manfred Schönfelder, Leverkusen; Hans-Joachim Höfer, Cologne; Walter Krauss, Leverkusen, all of Fed. Rep. of Germany

[73] Assignee: Bayer Aktiengesellschaft, Leverkusen, Fed. Rep. of Germany

[21] Appl. No.: 329,902

[22] Filed: Mar. 28, 1989

[30] Foreign Application Priority Data

Apr. 2, 1988 [DE] Fed. Rep. of Germany ....... 3811350

[51] Int. Cl.$^5$ ...................... C08G 18/34; C08G 18/42
[52] U.S. Cl. ............... 252/182.2; 252/182.22
[58] Field of Search .......... 252/182.2, 182.22

[56] References Cited

U.S. PATENT DOCUMENTS

| | | | |
|---|---|---|---|
| 3,280,066 | 10/1966 | France et al. ................ | 528/67 |
| 3,454,533 | 7/1969 | Kerrigan et al. . | |
| 3,635,848 | 1/1972 | Rambosek ................ | 252/182.22 |
| 4,284,730 | 8/1981 | Narayan et al. ............. | 252/182.22 |
| 4,789,705 | 12/1988 | Kase et al. ................ | 524/590 |

FOREIGN PATENT DOCUMENTS 2-105812  4/1990  Japan ................ 252/182.2

*Primary Examiner*—John Kight, III
*Assistant Examiner*—Rabon Sergent
*Attorney, Agent, or Firm*—Joseph C. Gil; Thomas W. Roy

[57] ABSTRACT

The present invention is directed to a process for the production of isocyanurate polyisocyanates by the partial trimerization of the isocyanate groups of aliphatic diisocyanates in the presence of catalysts which accelerate the trimerization of isocyanate groups, termination of the trimerization reaction at the particular degree of trimerization required and removal of unreacted starting diisocyanate and, optionally, other volatile constituents, characterized in that at least one diol containing ester groups and having an average molecular weight of 350 to 950 is added to the reaction mixture at any time before removal of the excess starting diisocyanate in a quantity of 1 to 50% by weight, based on the weight of the diisocyanate used as starting material, the type of reactants and the quantitative ratios between them being selected so that, on completion of the reaction, at least 10% by weight free starting diisocyanate is still present in the reaction mixture, not including any inert solvent used, and the molar ratio of isocyanurate groups to urethane groups in the end products is about 20:1 to 0.2:1.

The present invention is also directed to the isocyanurate polyisocyanates obtained by this process and the use of these isocyanurate polyisocyanates, optionally blocked by blocking agents for isocyanate groups, for the production of polyurethane plastics, particularly two-component polyurethane lacquers.

16 Claims, No Drawings

PROCESS FOR THE PRODUCTION OF ISOCYANURATE POLYISOCYANATES, THE COMPOUNDS OBTAINED BY THIS PROCESS AND THEIR USE

BACKGROUND OF THE INVENTION

1. Field of the Invention

This invention relates to a new process for the production of isocyanurate polyisocyanates (polyisocyanates containing isocyanurate groups) containing urethane and ester groups, to the compounds obtained by this process and to their use as the polyisocyanate component for the production of polyurethane plastics, in particular two-component polyurethane lacquers (coatings).

2. Description of the Prior Art

The production of isocyanurate polyisocyanates is known (cf. for example GB-P 920,080, DE-AS 1,667,309, DE-OS 3,100,262, DE-OS 3,219,608, DE-OS 3,240,613, EP-A-10,589, EP-A-57,653, EP-A-89,297 or EP-A-187,105). Some of these prior publications also mention the use of subequivalent quantities of compounds containing hydroxyl groups. Thus, DE-AS 1,667,309 for example describes the production of isocyanurate polyisocyanates using compounds containing hydroxyl groups as co-catalysts. DE-OS 3,219,608 describes a use of polyhydric alcohols having a molecular weight below 3000 in a quantity of up to 15 mole-%, based on HDI used, in the production of isocyanurate polyisocyanates based on this starting diisocyanate. Suitable polyhydric alcohols according to this prior publication also include unspecified polyester polyols. In the process according to EP-A-155,559, low molecular weight diols containing lateral alkyl groups are used as modifying agents.

In all the known prior-published processes, the object of the urethane modification is merely to provide a suitable solvent for the catalyst, to achieve suitable co-catalysis or to establish compatibility with various polyols. None of the prior publications cited above discloses how it is possible to modify isocyanurate polyisocyanates in such a way that they are optimally suitable for the production of highly elastic lacquers which retain their elasticity, even at low temperatures of down to −40° C.

Aliphatic isocyanurate polyisocyanates, particularly those based on 1,6-diisocyantohexane (hereinafter referred to as "HDI"), have acquired industrial significance. They are primarily used as the polyisocyanate component in two-component polyurethane lacquers, but may also be used for the production of moisture-hardening one-component polyurethane binders or, when blocked by blocking agents for isocyanate groups, in heat-crosslinkable polyurethane lacquers. These lacquers are used mainly for lacquering non-flexible substrates, such as metal and wood, and are distinguished by high light stability and weather resistance, extreme hardness and very good adhesion. HDI-based isocyanurate polyisocyanates are particularly distinguished from corresponding biuret polyisocyanates, which are also used on an industrial scale, by greatly improved resistance to yellowing and chemicals, for example by their resistance to tar stains.

The chemical bases for the various polyurethane lacquers are described inter alia in "Lackkunstharze" by Hans Wagner and Hans Friedrich Sarx, Carl Hanser Verlag, Munchen 1971, pages 153 to 173 and in "Lehrbuch der Lacke and Beschichtungen" Vol. 1, Part 2, by Hans Knittel, Verlag W. A. Colomb, Berlin-Oberschwandorf 1973, pages 512 to 612.

However, state-of-the-art polyurethane lacquers, particularly two-component polyurethane lacquers, often lead to highly crosslinked lacquer coatings wherein the elasticity often fails to satisfy the requirements of coatings for flexible substrates. Flexible plastic components are being used to an increasing extent, particularly in the automotive field, in efforts to improve safety. These flexible moldings (fenders, spoilers, wing mirror housings and the like) are relatively large and, accordingly, largely determine the external appearance of the vehicle. For this reason, moldings of the type in question have to be lacquered. In addition, the surfaces of the plastics are degraded by the effects of weather and hence have to be protected accordingly.

However, elastic lacquer films are also required for non-elastic plastic moldings to prevent mechanical damage to such moldings. For example, hard, but tough thermoplasts have to be lacquered with highly elastic, extremely resistant lacquers to prevent the lacquer film from cracking in the event of mechanical damage or under the effect of other external influences and the cracks from propagating in the compact plastic. Accordingly, the lacquer finish, above all the surface lacquer, applied to such moldings has to satisfy demands far exceeding those of a normal lacquer finish.

These problems were partially solved by the development of hydroxyl polyesters and polyacrylates which, by virtue of their structure, can be processed to elastic lacquer films. However, it was not possible in this way to eliminate all existing difficulties. The lacquer films formed are often not sufficiently hard and are not sufficiently crosslinked and/or resistant to chemicals.

In addition, the diisocyanate-based, for example HDI-based, isocyanurate polyisocyanates available for the crosslinking of these polyhydroxyl compounds are often incompatible with the polyhydroxyl compounds or lead to clouding on dilution with various solvents.

These disadvantages have prevented known HDI-based isocyanurate polyisocyanates from acquiring any real significance in the lacquering of plastics despite their outstanding technical properties.

Accordingly, an object of the present invention is to provide new isocyanurate polyisocyanates which 1) in combination with state-of-the-art polyhydroxyl compounds provide two-component polyurethane lacquers which satisfy the particular requirements mentioned above 2) in particular, are optimally suited to the lacquering of elastic plastic moldings and 3) may also be used with advantage for the production of moisture-hardening one-component binders or, in blocked form, for the production of heat-crosslinkable lacquer binders.

This object may be achieved by isocyanurate polyisocyanates according to the invention which are described in detail in the following.

SUMMARY OF THE INVENTION

The present invention is directed to a process for the production of isocyanurate polyisocyanates by the partial trimerization of the isocyanate groups of aliphatic diisocyanates in the presence of catalysts which accelerate the trimerization of isocyanate groups, termination of the trimerization reaction at the particular degree of trimerization required and removal of unreacted starting diisocyanate and, optionally, other volatile constituents, characterized in that at least one diol containing ester groups and having an average molecular weight of 350 to 950 is added to the reaction mixture at any time before removal of the excess starting diisocyanate in a quantity of 1 to 50% by weight, based on the weight of the diisocyanate used as starting material, optionally using diols free from ester groups and having a molecular weight in the range from 62 to 300, the molar ratio of diols free from ester groups to diols containing ester groups being up to 1:1, and reacted with isocyanate groups to form urethane groups, the type of reactants and the quantitative ratios between them being selected so that, on completion of the reaction, at least 10% by weight free starting diisocyanate is still present in the reaction mixture, not including any inert solvent used, and the molar ratio of isocyanurate groups to urethane groups in the end products is about 20:1 to 0.2:1.

The present invention is also directed to the isocyanurate polyisocyanates obtained by this process and the use of these isocyanurate polyisocyanates, optionally blocked by blocking agents for isocyanate groups, for the production of polyurethane plastics, particularly two-component polyurethane lacquers.

DETAILED DESCRIPTION OF THE INVENTION

Starting materials for the process according to the invention include (i) aliphatic diisocyanates and (ii) selected polyester diols.

The aliphatic diisocyanates used as starting diisocyanate (i) are organic diisocyanates containing aliphatically and/or cycloaliphatically bound isocyanate groups. Typical examples include 1,6-diisocyanatohexane (HDI), 1-isocyanato-3,3,5-trimethyl-5-isocyanatomethyl cyclohexane (IPDI) or 4,4'-diisocyanatodicyclohexylmethane. (Cyclo)aliphatic diisocyanates other than HDI are preferably mixed with HDI. This means that the starting diisocyanate preferably used in accordance with the invention is either HDI or a mixture of HDI with other (cyclo)aliphatic diisocyanates of the type mentioned by way of example. The mixture preferably contains at least 30 mole-%, more preferably at least 70 mole-% HDI. Most preferably HDI is used as sole starting diisocyanate.

The diisocyanates used in accordance with the invention as starting materials may be used in technically pure form. In a particularly preferred embodiment, however, HDI substantially free from carbon dioxide is used as sole starting diisocyanate because a particularly mild trimerization reaction can be obtained in this way using minimal quantities of catalysts.

The HDI used with particular preference as the starting diisocyanate has a carbon dioxide content of less than 20 ppm (weight), preferably less than 10 ppm (weight) and more preferably less than 5 ppm (weight). Technical HDI purified by distillation, of the type previously used for the production of isocyanurate polyisocyanates, contains considerable quantities (approximately 20 ppm to 100 ppm (weight)) of carbon dioxide.

Carbon dioxide can enter the HDI during the production process, for example in the phosgenation of carbonic acid salts of hexamethylenediamine. It can also be taken up from the air during storage and can be formed by chemical reaction of the NCO groups with each other, for example by carbodiimidization, or by reaction with moisture. HDI freshly purified by vacuum distillation contains, for example, 40 ppm carbon dioxide after 24 hours in a sealed container. HDI stored over a period of about 6 months can contain up to 0.6% by weight carbon dioxide when the container has been opened during the period of storage.

Carbon dioxide can be removed from HDI by blowing out with ultra-pure nitrogen or with a noble gas, such as argon, for example at 0° to 70° C. Although higher temperatures may be applied, they do not afford any clear advantages.

It is of course also possible in a preferred variant to initially modify HDI containing more than 20 ppm carbon dioxide with a subequivalent quantity of ester diol in accordance with the invention, subsequently remove most of the dissolved carbon dioxide and, finally, carry out the trimerization reaction.

The polyester diols (ii) to be used in the process according to the invention have an average molecular weight (calculated from the hydroxyl number) of 350 to 950, preferably of 500 to 800. Suitable polyester diols include known polyester diols synthesized from diols and dicarboxylic acids. Suitable diols for the production of the polyester diols include dimethylol cyclohexane, ethanediol, propane-1,2- and -1,3-diol, butane-1,2-, -1,3- and -1,4-diol and neopentyl glycol. Mixtures thereof with hexane-1,6-diol are preferred. In a particularly preferred embodiment, hexane-1,6-diol is the sole diol component. Suitable dicarboxylic acids include aromatic dicarboxylic acids such as phthalic acid, isophthalic acid and terephthalic acid; cycloaliphatic dicarboxylic acids such as hexahydrophthalic acid, tetrahydrophthalic acid, endomethylene tetrahydrophthalic acid and anhydrides thereof; and preferably aliphatic dicarboxylic acids such as succinic acid, glutaric acid, adipic acid, suberic acid, azelaic acid and sebacic acid or anhydrides thereof.

Mixtures of the starting materials mentioned by way of example for the production of the polyesters may also be used. It is also possible to use mixtures of different polyesters of the type mentioned in the process according to the invention.

It is particularly preferred to use polyester diols of ε-caprolactone having a molecular weight in the ran9e mentioned which have been prepared in known manner from a diol of the type mentioned by way of example above as starter molecule and ε-caprolactone. In the present case, hexane-1,6-diol is preferably used as this diol.

Particularly preferred components (ii) are ε-caprolactone diols which have been prepared from hexane-1,6-diol as starter and which show a very narrow oligomer distribution. This can be achieved by the use of boron trifluoride etherate or organotin compounds as catalyst for the polymerization reaction. These particularly preferred ester diols have at least 50% by weight of molecules in the molecular weight range of 460 to 802.

In addition to these polyester diols, it is also possible, although less preferred, to use diols free from ester groups, for example those having a molecular weight of 62 to 300. Examples include ethane diol, butane-1,3-diol, 2,2,4-trimethylpentane-1,3-diol and, in particular, 2-ethylhexane-1,3-diol. The molar ratio of diol free from ester groups to diol containing ester groups may be up to 1:1.

In principle, the process according to the invention may be carried out analogously to known processes for the production of isocyanurate polyisocyanates. This means in particular that known trimerization catalysts of the type disclosed, for example, in the literature references cited above may be used.

Quaternary ammonium hydroxides are preferably used as catalysts in the process according to the invention. Generally, it is possible to use any quaternary ammonium hydroxides known as trimerization catalysts for isocyanate groups. Suitable quaternary ammonium hydroxides include the quaternary ammonium hydroxides according to U.S. Pat. No. 3,487,080 (herein incorporated by reference), column 2, lines 10 to 38, or EP-A-10,589, page 6, line 5 to page 8, line 10 (U.S. Pat. No. 4,324,879, herein incorporated by reference). Other suitable quaternary ammonium hydroxides include compounds corresponding to the formula

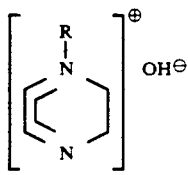

wherein
R is a $C_1$-$C_{20}$, preferably alkyl radical; a $C_7$-$C_{10}$, preferably $C_7$ araliphatic hydrocarbon radical; or a saturated $C_4$-$C_{10}$, preferably $C_5$-$C_6$ cycloaliphatic hydrocarbon radical.

Preferred catalysts include compounds corresponding to the formula

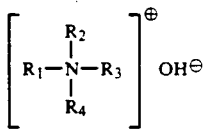

wherein
$R_1$, $R_2$ and $R_3$ may be the same or different and represent $C_1$-$C_{18}$, preferably $C_1$-$C_4$ alkyl radicals, more preferably methyl groups, and
$R_4$ is a benzyl, 2-hydroxyethyl, 2-hydroxypropyl or 2-hydroxybutyl radical.

Particularly preferred catalysts are N,N,N-trimethyl-N-benzyl ammonium hydroxide and N,N,N-trimethyl-N-(2-hydroxypropyl)-ammonium hydroxide.

The optimum quantity of catalyst depends upon the nature of the catalyst and may be determined by a preliminary test. In the process according to the invention, the catalyst is generally used in a quantity of less than 1% by weight, based on the starting diisocyanate used. When HDI, which has been substantially freed from carbon dioxide as previously discussed, is used as the starting diisocyanate and when the preferred ammonium hydroxide catalysts are used, the quantity of catalyst used is less than 0.03% by weight, preferably less than 0.01% by weight and more preferably 0.0005 to 0.005% by weight, based on the HDI used.

The catalysts may be used in solvent-free form although they are preferably used in the form of dilute solutions. Suitable solvents are described in the cited publications.

Trimerization and urethanization reactions are preferably carried out in the absence of solvents, although this does not preclude the use of standard lacquer solvents, for example, esters such as butyl acetate or ethoxyethyl acetate; ketones such as methyl isobutylketone or methylethylketone; hydrocarbons such a xylene; and mixtures of these solvents. However, since unreacted starting diisocyanate is subsequently removed, the additional use of such solvents results in unnecessary additional distillation.

To complete the trimerization reaction, the catalyst is generally deactivated by heat and/or by the addition of a suitable catalyst poison to the reaction mixture. Suitable catalyst poisons, particularly when the preferred ammonium hydroxide catalysts are used, include inorganic acids such as hydrochloric acid, phosphorous acid or phosphoric acid; sulfonic acid or derivatives thereof such as methanesulfonic acid, p-toluenesulfonic acid or p-toluenesulfonic acid methyl or ethyl ester; and perfluorinated sulfonic acids such as nonafluorobutane sulfonic acid. Particularly suitable deactivators, i.e. catalyst poisons, include acidic esters of phosphorous acid or phosphoric acid such as dibutylphosphite, dibutylphosphate or di-(2-ethylhexyl)-phosphate, which are preferably used in the form of a dilute solution in HDI. The deactivators are generally added to the reaction mixture in a quantity at least equivalent to the catalyst. However, since the catalysts can partially decompose during the trimerization reaction, it is often sufficient to add a sub-equivalent quantity of the deactivator. When thermally labile catalysts such as quaternary ammonium hydroxides containing hydroxyalkyl substituents at the nitrogen are used, it is often unnecessary to add a catalyst poison because the reaction may be terminated by briefly heating the reaction mixture to temperatures above 100° C. (thermal decomposition, i.e., deactivation of the catalyst).

However, it is often advisable to use a larger than equivalent quantity, for example twice the equivalent quantity of deactivator, to guarantee complete termination of the reaction. Accordingly, it is preferred to use deactivators (catalyst poisons) in up to twice the equivalent quantity, based on the quantity of catalyst used.

An important aspect of the invention is that, in addition to partial trimerization of the isocyanate groups of the starting diisocyanate, some of the isocyanate groups are modified by urethanization with the previously mentioned diols. The order in which urethanization and trimerization take place is immaterial provided that both process steps are carried out before removal of the excess starting diisocyanate. This means that the urethanization reaction with the diol (which consumes a portion of the isocyanate groups) can take place before the addition of the trimerization catalyst. The urethanization reaction may also be carried out with only part of the excess diisocyanate; more diisocyanate can then be added before the subsequent trimerization reaction. The urethanization and trimerization reactions may be carried out at the same time by adding diol and trimerization catalyst at the same time, for example in admixture. The urethanization reaction may begin before the trimerization reaction is fully completed, although it may also be initiated on completion of the trimerization reaction. The diol may also be added in portions at any time during the process. The trimerization and urethanization reactions should be completed before removing excess starting diisocyanate.

The quantitative ratios between the individual reactants should be selected to ensure that the starting diisocyanate is used in such an excess that, on completion of the reaction, the reaction mixture still contains at least 10% by weight, preferably 35 to 70% by weight of unreacted starting diisocyanate, based on the mixture as a whole, not including any inert solvent used. The molar ratio of isocyanurate groups to urethane groups in the end products freed from excess starting diisocyanate is about 20:1 to 0.2:1, preferably about 5:1 to 0.5:1.

The process according to the invention is generally carried out at a temperature of about 0° to 150° C. The urethanization step, which may optionally be carried out separately at the beginning or at the end of the process, preferably takes place at about 20° to 150° C., more preferably 80° to 130° C. The trimerization steps which optionally takes place separately before or after the urethanization step, preferably takes place at a temperature of about 0° to 100° C., more preferably about 20 to 80° C. If the two reaction steps are carried out at the same time, the reaction temperatures are generally about 0° to 100° C., preferably about 40° to 80° C. The trimerization reaction is terminated thermally and/or by the addition of a catalyst poison, preferably after a degree of trimerization of about 10 to 40%, more preferably about 20 to 30% has been reached. The "degree of trimerization" is understood to be the percentage of isocyanate groups of the starting diisocyanate which reacts to form trimers; the urethanization step is disregarded in this calculation. However, it is essential that the reaction mixture still contains at least 10% by weight of unreacted starting diisocyanate on completion of urethanization and trimerization.

On completion of the urethanization and trimerization reactions, the excess starting diisocyanate is separated off, optionally together with other volatile constituents present in the reaction mixture (such as solvent) by a suitable measure to a residual content of starting diisocyanate of at most 0.5% by weight. This can be done by thin-layer distillation or extraction, for example using n-hexane as extractant.

The end products of the process according to the invention containing urethane and isocyanurate groups are liquid, substantially colorless polyisocyanates. The products of the process according to the invention, which are based on HDI, generally have an NCO content of about 6 to 20% by weight and a HAZEN color value (DIN 53 409) of less than 100, preferably less than 50.

The products of the process according to the invention are soluble in standard solvents (such as esters, ketones and hydrocarbons, and may be diluted therewith without clouding) and are distinguished by high stability in storage. They are substantially free from secondary products. They are also eminently suitable for use as hardeners for two-component polyurethane lacquers, in which the usual polyether polyols, polyester polyols and/or polyacrylate polyols are present as polyhydroxyl compounds suitable as reactants for the polyisocyanates. Particularly preferred reactants for the products of the process according to the invention are polyacrylates containing hydroxyl groups, i.e., polymers or copolymers of alkyl(meth)acrylates, optionally with styrene or other copolymerizable olefinically unsaturated monomers.

The two-component polyurethane lacquers, which contain combinations of such polyhydroxyl compounds as binders with the products of the process according to the invention as hardeners, may also contain the additives and auxiliaries normally used in lacquers such as pigments, levelling agents, catalysts, solvents and the like. The two-component polyurethane lacquers, which contain the products of the process according to the invention as hardeners, harden at room temperature or slightly elevated temperature to form lacquer films resistant to chemicals.

The end products of the process according to the invention may also be blocked by blocking agents and used as hardeners in heat-crosslinkable one-component lacquers. Suitable blocking agents are known and include phenol; cresols; trimethylphenols; tert.-butylphenols; tertiary alcohols such as tert.-butanol, tert.-amyl alcohol and dimethylphenylcarbinol; compounds which readily form enols such as ethyl acetoacetate, acetyl acetone and malonic acid diethyl ester; secondary aromatic amines such as N-methylaniline, the N-methyltoluidines, N-phenyltoluidine and N-phenylxylidine; imides such as succinimide; lactams such as $\epsilon$-caprolactam and 6-valerolactam; oximes such as butanone oxime and cyclohexanone oxime; mercaptans such as methyl mercaptan, ethyl mercaptan, butyl mercaptan, 2-mercaptobenzthiazole, $\alpha$-naphthyl mercaptan and dodecyl mercaptan; and triazoles such as 1H-1,2,4-triazole.

The end products of the process according to the invention may also be combined with polyamines wherein the amino groups may be blocked such as polyketimines, polyaldimines or oxazolidines. Under the influence of moisture, free amino groups (and in the case of the oxazolidine, free OH groups) are formed which react with the NCO groups to provide crosslinking.

In these lacquer combinations, the polyisocyanate component and the reactant are present in such quantities that there are about 0.8 to 3, preferably about 0.9 to 1.8 (optionally blocked) isocyanate-reactive groups for each (optionally blocked) NCO group.

Coating compositions containing the end products of the process according to the invention, optionally in blocked form, as hardeners are suitable for coating any substrates. They are distinguished from analogous coating compositions containing known polyisocyanates as hardeners by increased flexibility of the coatings. A particularly preferred application for the end products of the process according to the invention is as a hardener for two-component lacquers based on the polyhydroxyl compounds mentioned by way of example above, especially for the lacquering of flexible plastic moldings. The lacquers containing the polyisocyanates according to the invention provide films which also adhere surprisingly well to metallic substrates and show particular stability to light, a high heat distortion temperature and high abrasion resistance. They are also distinguished by extreme hardness, elasticity, very good resistance to chemicals, high gloss, excellent weather resistance and good pigmentability.

In the following examples, all percentages are percentages by weight.

EXAMPLES

Example 1

(Preparation of a catalyst solution)

600 g 2-ethylhexane-1,3-diol were added to and stirred with 1000 g of a commercially available, colorless, 40% solution of N,N,N-trimethyl-N-benzyl ammonium hydroxide, in methanol. Methanol was completely removed with thorough stirring in a water jet pump vacuum at 30° to 40° C. The 40% stock solution was diluted with additional 2-ethylhexane-1,3-diol to a concentration of 0.5%.

Example 2

(Preparation of a catalyst solution)

60 g 2-ethylhexanol were added to 100 g of a 70% solution in methanol of N,N,N-trimethyl-N-(2-hydroxypropyl)-ammonium hydroxide, which was prepared by the reaction of trimethylamine with propylene oxide in methanol. Methanol was subsequently removed in a water jet pump vacuum. The stock solution was diluted with additional 2-ethylhexanol to a concentration of 4%. The solution was brown in color.

Example 3

(Preparation of a diol)

A melt at 120° to 140° C. from 2920 parts by weight adipic acid, 2910 parts by weight neopentyl glycol and 470 parts by weight hexane-1,6-diol. The temperature was then slowly increased to 180° C. over a period of about 12 hours, during which time water was distilled off. The melt was then kept at 200° C. for about 2 hours. 0.03 parts by weight $SnCl_2.2H_2O$ were then added as catalyst, a vacuum was applied and the mixture was heated for about 15 hours to 180°-200° C.

A liquid, light yellow colored polyester having the following data was obtained:

OH value: 225 (calculated 241)
Acid value: 1
Average molecular weight (calculated from hydroxyl number): 498

Example 4

(Preparation of a diol)

57.3 kg ε-caprolactone, 12.7 kg hexane-1,6-diol and 3.5 g tin(II) octoate were mixed in a nitrogen-purged 1000 liter vessel and heated to 160° C. The reaction was complete after 4 hours at 160° C. After cooling, the mixture (70 kg) was drained off; the product was liquid at room temperature.

Data of the diol:
$\eta 25°$ C.: 330 mPa.s
OH value: 172.4
Acid value: 0.6
Color value (HAZEN) according to DIN 53 409: 30
Average molecular weight (calc. from OH number): 650

Analysis by gel chromatography revealed the following oligomer distribution of the polyester:

| Oligomer molecular weight | Experimental (% surface area = % by weight) |
|---|---|
| 118 | 0.15 |
| 232 | 1.75 |
| 346 | 5.76 |
| 460 | 11.44 |
| 574 | 15.92 |
| 688 | 19.19 |
| 802 | 15.62 |
| 916 | 12.08 |
| 1030 | 8.15 |
| 1144 | 5.25 |
| >1144 | 4.69 |

Result: more than 50% by weight of the molecules present in the polyester were in the molecular weight range of 460 to 802.

Example 5

(Invention)

1596 g (9.5 mole) HDI were mixed in a suitable stirred vessel with 650 g (1 mole) of the polyester diol of Example 4 and the resulting mixture was heated for 3 h at 90° to 100° C. The NCO content of the reaction mixture fell to 30.7%.

A vigorous stream of pure nitrogen was then passed through the liquid for about 1 h at 40° C., after which the liquid contained less than 5 ppm (weight) dissolved carbon dioxide. More nitrogen was passed through the reaction mixture throughout the remainder of the reaction. 21.9 g (approx. 0.1095 g active substance=approx. 70 ppm) of the catalyst solution of Example 1 were then introduced dropwise over a period of 15 to 30 minutes, followed by heating for 30 minutes to a temperature of 65° to 70° C. which was then maintained for 2.5 hours. When the NCO content of the crude product was 22.8%, 0.22 g of a 25% solution of dibutylphosphate in HDI is added, followed by stirring for 15 minutes at 60° C. After cooling to about 23° C., excess HDI was removed by distillation in a short-path evaporator. 610 g HDI were recovered and 1630 g of a viscous colorless liquid having the following characteristic data were obtained:

NCO content: 11.85%
Viscosity: 9500 mPa.s/23° C.
Free HDI: 0.07%
Color value (HAZEN) according to DIN 53 409: 30

The molar ratio of urethane groups to isocyanurate groups in the product was about 2:1 (calculated).

Example 6

The procedure was as described in Example 5 using the following quantities:

2100 g (12.5 mole) HDI
250 g (0.5 mole) of the polyester diol of Example 3
24.3 g of the catalyst solution of Example 1
0.3 g 25% solution of dibutylphosphate in HDI.

After removal of unreacted HDI, 968 g of a colorless liquid having the following data were obtained:

NCO content: 16.7%
Viscosity: 4500 mPa.s/23° C.
Free HDI: 0.12%
Color value (HAZEN) according to DIN 53 409: 40

The calculated molar ratio of urethane groups to isocyanurate groups in the product was about 1:1.

Example 7

The procedure was as in Example 5 using the following quantities:

1428 g (8.5 mole) HDI
250 g (0.5 mole) of the polyester of Example 3
19.6 g of the catalyst solution of Example 1
0.2 g 25% solution of dibutylphosphate in HDI After the reaction was terminated at an NCO content of the mixture of 31.8%, excess HDI was removed and 1014 g of a colorless liquid having the following data were obtained:

NCO content: 15.5%
Viscosity: 7500 mPa.s/23° C.
Free HDI: 0.09%
Color value (HAZEN) according to DIN 53 409: 30

The calculated molar ratio of urethane to isocyanurate group was about 1:1.

Example 8

(Invention, alternative embodiment)

1596 g (9.5 mole) HDI were heated to 50° C. in a suitable stirred vessel and freed from carbon dioxide by passing nitrogen through the liquid until the residual content of carbon dioxide was less than 5 ppm (weight). 6.5 g of the catalyst of Example 2 were then added; the temperature rose to 60° C. This temperature was maintained for about 6 h, at which time the NCO content had fallen to 40.5%. The catalyst was deactivated by heating the mixture for 10 minutes to 120° C. 650 g of the polyester diol of Example 4 were then poured into the liquid, followed by stirring for 4 hours at 90° to 100° C. The NCO content was then 23.0%. Monomeric HDI was removed by thin-layer distillation at 120° C. in a short-path evaporator. 1585 g of a viscous liquid having the following characteristic data were obtained:

NCO content: 12.1%
Viscosity: 10,500 mPa.s/23° C.
Free HDI: 0.1%
Color value (HAZEN) according to DIN 53 409: 50

Example 9

(Invention)

798 g (4.75 mole) HDI were reacted as in Example 5 with 244 g (0.375 mole) of the diol of Example 4 and 18 g (0.125 mole) of cyclohexane-1,4-dimethanol. Using 10 g of the catalyst solution of Example 1, the mixture was then trimerized as in Example 5 to an NCO content of 26.9%, after which the reaction was terminated by the addition of 0.12 g of a 25% solution of dibutylphosphate in HDI. Removal of monomeric HDI by distillation provided 680 g of a viscous liquid having the following properties:

NCO content: 12.8%
Viscosity: 4700 mPa.s/23° C.
Free HDI: 0.04%
Color value (HAZEN) according to DIN 53 409: 40

The calculated molar ratio of urethane to isocyanurate was about 2:1.

Examples 10 to 15

(Invention)

The procedure in Examples 10 to 12 was the same as in Example 5, i.e., first urethanization and then trimerization. In Examples 13 to 15, the procedure was the same as in Example 8, i.e., first trimerization and then urethanization. Catalysis and termination as described in Examples 5 and 8. The reaction data and characteristics of the end products are shown in the following Table.

TABLE 1

| Example | Quantity of HDI used | Quantity of diol of Ex. 4 used | NCO content on termination of the reaction | Quantity of product after removal of HDI | NCO content of the product/viscosity at 23° C. | HAZEN color value acc. to DIN 53409 | Free HDI content | Molar Ratio urethane isocyanurate |
|---|---|---|---|---|---|---|---|---|
| 10 | 672 g | 41 g | 35.0% | 335 g | 17.4%/5500 mPa·s | 80 | 0.04 | 1:4 |
| 11 | 714 g | 83 g | 32.5% | 418 g | 16.3%/6000 mPa·s | 50 | 0.07 | 1:2 |
| 12 | 798 g | 166 g | 27.0% | 615 g | 14.7%/10000 mPa·s | 30 | 0.04 | 1:1 |
| 13 | 672 g | 41 g | 38.4% | 270 g | 17.0%/3000 mPa·s | 90 | 0.1 | 1:4 |
| 14 | 714 g | 83 g | 34.0% | 375 g | 16.8%/4200 mPa·s | 40 | 0.12 | 1:2 |
| 15 | 798 g | 166 g | 32.4% | 450 g | 13.1%/3000 mPa·s | 40 | 0.05 | 1:1 |

Example 16

(Application Example)

The two polyisocyanates according to Examples 5 and 15 were used in combination with a hydroxylpolyacrylate as a lacquer binder for coating an elastic plastic in comparison with two known polyisocyanates.

The hydroxypolyacrylate used was a 65% solution in xylene of a copolymer of 18% by weight styrene, 26% by weight hydroxyethyl acetate, 55% by weight butylacrylate and 1% acrylic acid. The solution had a hydroxyl value of 72, an acid value of 5.9 and a viscosity of 2300 mPa.s/23° C.

The HDI-based isocyanurate polyisocyanate obtained according to example 2 of U.S. Pat. No. 4 324 879 which was not diol-modified (A) and a diol-modified isocyanurate polyisocyanate (B), again based on HDI, prepared in accordance with Example 9 of DE-OS 3,219,608 were used as comparison polyisocyanates.

Polyisocyanate (A) in solvent-free form had an NCO content of 21.8% and a viscosity of 4000 mPa.s/23° C., while polyisocyanate (B) had an NCO content of 19.0% and a viscosity of 11,500 mPa.s at 23° C.

The compositions were used to coat sheets of a semi-rigid, elastic PUR integral foam plastic. The sheets had been pretreated with a primer.

The composition of polyisocyanate and hydroxyl component was mixed to provide an NCO:OH equivalent ratio of 1:1. A TiO$_2$ pigment (of the rutile type) was incorporated in the hydroxyl component in known manner, i.e., on a three-roll mixer. The ratio by weight of organic binder to pigment in the ready-to-spray coating was 1.5. 0.3% by weight (based on binder) diazabicyclooctane was added as catalyst.

The mixtures were adjusted with more solvent to an outflow time (DIN 53 211, 4 mm of approximately 20 seconds. The pot life of these ready-to-spray lacquers in a closed container was at least 20 seconds. They were sprayed onto the plastic sheets and the properties were determined. The results are shown in Table 2 below. The adhesion, gloss and impact elasticity of the lacquer films are not shown. In each case, they are of a high level.

TABLE 2

| Test | Lacquer containing comparison polyiso-cyanate (A) | Lacquer containing comparison polyiso-cyanate (B) | Lacquer containing polyiso-cyanate of Example 5 | Lacquer containing polyiso-cyanate of Example 15 |
|---|---|---|---|---|
| Pendulum hardness (s) (DIN 53157) after | | | | |
| 45 mins/80° C. | 32 | 35 | 28 | 27 |
| 7 days/approx. 23° C. | 100 | 120 | 105 | 50 |
| 14 days/approx. 23° C. | 125 | 130 | 110 | 83 |
| 14 days/approx. 23° C. + 30 mins at 80° C. | 130 | 135 | 120 | 90 |
| Dissolvability after storage of the lacquer film for 45 mins at 80° C. and 14 days at approx. 23° C. (1) | | | | |
| Toluene | 2 | 2 | 2 | 1–2 |
| Methoxypropyl acetate | 1 | 1 | 1–2 | 2 |
| Ethyl acetate | 2 | 2–3 | 2–3 | 3 |
| Acetone | 3 | 3 | 2–3 | 2–3 |
| Folding test at various temperatures/ 1 inch (= 2.54 cm) (2) | | | | |
| +20° C. | + | + | + | + |
| +5° C. | + | + | + | + |
| 0° C. | 0 | — | + | + |
| −5° C. | — | — | + | + |
| −10° C. | — | — | + | + |
| −15° C. | — | — | + | + |
| −20° C. | — | — | + | + |
| −40° C. | — | — | — | + |

+ = O.K., 0 = incipient cracking, − = cracked

Explanation of Table 2

(1) The dissolvability of the lacquer films was evaluated after 1 minute in contact with the solvent. The damage to the lacquer film was evaluated in 6 stages from 0 = lacquer film was completely unchanged to 5 = lacquer film dissolved.

(2) The folding test was carried out with the PUR sheets. After the lacquers were sprayed onto the primed and lightly abraded sheets, they were briefly aired, baked for 45 minutes at 80° C. and then aged for 1 week at approximately 23° C. 2 cm wide strips were then cut and stored for about 30 minutes at the particular measuring temperatures. The strips were then bent around a 1 inch mandrel which was maintained at the particular measuring temperature. The test was also conducted at the particular measuring temperature (in a cold chamber).

Evaluation of the test specimens:
+: film O.K.
0: incipient cracking
—: cracked

Example 17

This Example investigated the advantages which the polyisocyanates according to the invention afford in regard to long-term storage in standard lacquer solvents. The two polyisocyanates of Examples 5 and 15 were again compared with polyisocyanates (A) and (B). The long-term storage took place at room temperature in sealed glass bottles, which were visually examined, in the following solvents: methoxypropyl acetate (MPA), ethyl glycol acetate (EGA), xylene (X), butyl acetate (BA) and ethyl acetate (EA). The results are shown in Table 3.

TABLE 3

| Solvent | Polyisocyanate | 7 days 35% | 7 days 30% | 14 days 35% | 14 days 30% | 21 days 35% | 21 days 30% | 28 days 35% | 28 days 30% | 2 months 35% | 2 months 30% | 4 months 35% | 4 months 30% |
|---|---|---|---|---|---|---|---|---|---|---|---|---|---|
| MPA | (A) | 0 | 0 | 0 | 0 | 0 | 1 | 1 | 1–2 | — | — | — | — |
|  | (B) | 0 | 0 | 0 | 1 | 0 | 2 | 1 | 2 | — | — | — | — |
|  | of Example 5 | 0 | 0 | 0 | 0 | 0 | 0 | 0 | 0 | 0 | 0 | 0 | 0 |
|  | of Example 15 | 0 | 0 | 0 | 0 | 0 | 0 | 0 | 0 | 0 | 0 | 0 | 0 |
| EGA | (A) | 0 | 0 | 0 | 0 | 0 | 0 | 1 | 2 | — | — | — | — |
|  | (B) | 0 | 0 | 0 | 0 | 1 | 2 | — | — | — | — | — | — |
|  | of Example 5 | 0 | 0 | 0 | 0 | 0 | 0 | 0 | 0 | 1 | 1 | — | — |
|  | of Example 15 | 0 | 0 | 0 | 0 | 0 | 0 | 0 | 0 | 0 | 0 | 0 | 1 |
| X | (A) | 0 | 0 | 0 | 0 | 0 | 0 | 1 | 2 | — | — | — | — |
|  | (B) | 0 | 0 | 1 | 2 | — | — | — | — | — | — | — | — |
|  | of Example 5 | 0 | 0 | 0 | 0 | 0 | 1 | 0 | 1 | — | — | — | — |
|  | of Example 15 | 0 | 0 | 0 | 0 | 0 | 0 | 0 | 1 | — | — | — | — |
| BA | (A) | 0 | 0 | 0 | 1 | 1 | 2 | — | — | — | — | — | — |
|  | (B) | 0 | 0 | 0 | 1 | 1 | 2 | — | — | — | — | — | — |
|  | of Example 5 | 0 | 0 | 0 | 0 | 0 | 0 | 0 | 0 | 0 | 1 | 0 | 1 |
|  | of Example 15 | 0 | 0 | 0 | 0 | 0 | 0 | 0 | 1 | 0 | 2 | 0 | 1 |
| EA | (A) | 0 | 0 | 1 | 0 | 1 | 0 | 1 | 1 | — | — | — | — |
|  | (B) | 0 | 0 | 0 | 0 | 1 | 1 | 2 | 1 | — | — | — | — |
|  | of Example 5 | 0 | 0 | 0 | 0 | 0 | 0 | 0 | 0 | 0 | 1 | 0 | 1 |
|  | of Example 15 | 0 | 0 | 0 | 0 | 0 | 0 | 0 | 0 | 1 | 0 | 1 | 1 |

Explanation of the Table: 0 = O.K., clear solution; 1 = incipient clouding; 2 = clouded

Summary of the results of Examples 16 and 17

The lacquer polyisocyanates to the invention are distinguished from the prior art by the fact that they provide lacquer films which show higher elasticity and, above all, higher flexural elasticity at low temperatures. At the same time, the slightly lower surface hardness is still entirely adequate for all practical applications. The products obtained by the process according to the invention are also distinctly superior in storage in dilute solutions, which is indicative of their high compatibility.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a liquid isocyanurate polyisocyanate which comprises:
    (a) trimerizing a portion of the isocyanate groups of an aliphatic or cycloaliphatic diisocyanate in the presence of a catalyst which accelerates the trimerization of isocyanate groups,
    (b) terminating the trimerization reaction at the desired degree of trimerization and
    (c) removing unreacted starting diisocyanate,
    wherein the process additionally comprises adding, prior to step (c), about 1 to 50% by weight, based on the weight of said aliphatic diisocyanate, of at least one diol containing ester groups and having an average molecular weight of 350 to 950, optionally in admixture with a diol free from ester groups and having a molecular weight of 62 to 300, the molar ratio of diol free from ester groups to diol containing ester groups being about 0:1 to 1:1,
    the type of reactants used and the quantitative ratios between them being selected such that on completion of the reaction at least 10% by weight of unreacted starting diisocyanate is present in the reaction mixture, not including any inert solvent present, and the molar ratio of isocyanurate groups to urethane groups in the product is about 20:1 to about 0.2:1.

2. The process of claim 1 wherein said aliphatic diisocyanate comprises 1,6-diisocyanatohexane.

3. The process of claim 1 wherein the diol containing ester group comprises a polyester based on adipic acid.

4. The process of claim 2 wherein the diol containing ester group comprises a polyester based on adipic acid.

5. The process of claim 1 wherein the diol containing ester groups comprises a polyester based on ε-caprolactone.

6. The process of claim 2 wherein the diol containing ester groups comprises a polyester based on ε-caprolactone.

7. The process of claim 1 wherein said diol containing ester groups comprises a polyester diol which has been prepared by the reaction of ε-caprolactone with 1,6-dihydroxyhexane, wherein more than 50% by weight of the molecules of said polyester diol have a molecular weight between 460 and 802.

8. The process of claim 2 wherein said diol containing ester groups comprises a polyester diol which has been prepared by the reaction of ε-caprolactone with 1,6-dihydroxyhexane, wherein more than 50% by weight of the molecules of said polyester diol have a molecular weight between 460 and 802.

9. A liquid isocyanurate polyisocyanate prepared by a process which comprises:
    (a) trimerizing a portion of the isocyanate groups of an aliphatic or cycloaliphatic diisocyanate in the presence of a catalyst which accelerates the trimerization of isocyanate groups,
    (b) terminating the trimerization reaction at the desired degree of trimerization and
    (c) removing unreacted starting diisocyanate,
    wherein the process additionally comprises adding, prior to step (c), about 1 to 50% by weight, based on the weight of said aliphatic diisocyanate, of at least one diol containing ester groups and having an average molecular weight of 350 to 950, in admixture with a diol free from ester groups and having a molecular weight of 62 to 300, the molar ratio of diol free from ester groups to diol containing ester groups being about 0:1 to 1:1,
    the type of reactants used and the quantitative ratios between them being selected such that on completion of the reaction at least 10% by weight of unreacted starting diisocyanate is present in the reaction mixture, not including any inert solvent present, and the molar ratio of isocyanurate groups to urethane groups in the product is about 20:1 to about 0.2:1.

10. The isocyanurate polyisocyanate of claim 9 wherein said aliphatic diisocyanate comprises 1,6-diisocyanatohexane.

11. The isocyanurate polyisocyanate of claim 9 wherein the diol containing ester group comprises a polyester based on adipic acid.

12. The isocyanurate polyisocyanate of claim 10 wherein the diol containing ester group comprises a polyester based on adipic acid.

13. The isocyanurate polyisocyanate of claim 9 wherein the diol containing ester groups comprises a polyester based on ε-caprolactone.

14. The isocyanurate polyisocyanate of claim 10 wherein the diol containing ester groups comprises a polyester based on ε-caprolactone.

15. The isocyanurate polyisocyanate of claim 9 wherein said diol containing ester groups comprises a polyester diol which has been prepared by the reaction of ε-caprolactone with 1,6-dihydroxyhexane, wherein more than 50% by weight of the molecules of said polyester diol have a molecular weight between 460 and 802.

16. The isocyanurate polyisocyanate of claim 10 wherein said diol containing ester groups comprises a polyester diol which has been prepared by the reaction of ε-caprolactone with 1,6-dihydroxyhexane, wherein more than 50% by weight of the molecules of said polyester diol have a molecular weight between 460 and 802.

* * * * *